(12) United States Patent
Zhou et al.

(10) Patent No.: US 12,197,076 B2
(45) Date of Patent: Jan. 14, 2025

(54) BACKLIGHT MODULE, IN-VEHICLE DISPLAY PANEL, AND VEHICLE CROSS-REFERENCE TO RELATED APPLICATION

(71) Applicant: WUHAN CHINA STAR OPTOELECTRONICS TECHNOLOGY CO., LTD., Wuhan (CN)

(72) Inventors: Zheng Zhou, Wuhan (CN); Suimang Song, Wuhan (CN)

( * ) Notice: Subject to any disclaimer, the term of this patent is extended or adjusted under 35 U.S.C. 154(b) by 0 days.

(21) Appl. No.: 17/295,074

(22) PCT Filed: Apr. 30, 2021

(86) PCT No.: PCT/CN2021/091519
§ 371 (c)(1),
(2) Date: May 19, 2021

(87) PCT Pub. No.: WO2022/222183
PCT Pub. Date: Oct. 27, 2022

(65) Prior Publication Data
US 2024/0264488 A1     Aug. 8, 2024

(30) Foreign Application Priority Data
Apr. 20, 2021 (CN) .......................... 202110425171.9

(51) Int. Cl.
*G02F 1/13357* (2006.01)
*F21V 8/00* (2006.01)
*B60K 35/22* (2024.01)

(52) U.S. Cl.
CPC ..... *G02F 1/133608* (2013.01); *G02B 6/0088* (2013.01); *G02B 6/009* (2013.01);
(Continued)

(58) Field of Classification Search
CPC ......... G02F 1/133608; G02F 1/133603; G02F 1/133606; G02F 1/133615; G02B 6/0088;
(Continued)

(56) References Cited

U.S. PATENT DOCUMENTS 6,007,209 A * 12/1999 Pelka ................ G02F 1/133603
362/97.3
8,901,848 B2 * 12/2014 Watanabe ................. F21S 8/04
315/294
(Continued)

FOREIGN PATENT DOCUMENTS

CN       101225940 A       7/2008
CN       101706075 A       5/2010
(Continued)

*Primary Examiner* — Omar Rojas Cadima

(57) ABSTRACT

The present application provides a backlight module, an in-vehicle display panel, and a vehicle. The backlight module includes a first backlight module and a second backlight module. The first backlight module includes an opening. The second backlight module is installed in the opening. The first backlight module and the second backlight module are of different types, so the first backlight module and the second backlight module can emit light separately according to different backlight control types, and therefore, a fault tolerance of the backlight module is improved.

20 Claims, 8 Drawing Sheets

(52) U.S. Cl.
CPC .. *G02F 1/133603* (2013.01); *G02F 1/133606* (2013.01); *G02F 1/133615* (2013.01); *B60K 35/22* (2024.01); *B60K 2360/1523* (2024.01); *B60K 2360/332* (2024.01); *B60K 2360/336* (2024.01)

(58) Field of Classification Search
CPC .............................. G02B 6/009; B60K 35/22; B60K 2360/1523; B60K 2360/332; B60K 2360/336; G09F 13/18; H01H 2219/044; F21V 7/0016
See application file for complete search history.

(56) References Cited

U.S. PATENT DOCUMENTS

| | | | |
|---|---|---|---|
| 2008/0117355 A1* | 5/2008 | Mori ................ | G02B 6/0068 362/235 |
| 2011/0235308 A1 | 9/2011 | Kang et al. | |
| 2012/0206321 A1* | 8/2012 | Lee .................. | G02B 6/0055 362/602 |

FOREIGN PATENT DOCUMENTS

| | | | |
|---|---|---|---|
| CN | 102128398 | A | 7/2011 |
| CN | 103439831 | A | 12/2013 |
| CN | 204964950 | U | 1/2016 |
| CN | 206557427 | U | 10/2017 |
| CN | 211014943 | U | 7/2020 |
| JP | 2012208451 | A | 10/2012 |
| JP | 2012216327 | A | 11/2012 |

* cited by examiner

BACKLIGHT MODULE, IN-VEHICLE DISPLAY PANEL, AND VEHICLE CROSS-REFERENCE TO RELATED APPLICATION

CROSS-REFERENCE TO RELATED APPLICATION

This application is a National Phase Application and claims priority to PCT Patent Application No. PCT/CN2021/091519, having an International filing date of Apr. 30, 2021.

FIELD OF DISCLOSURE

The present application relates to the field of display technology and in particular to a backlight module, an in-vehicle display panel, and a vehicle.

DESCRIPTION OF PRIOR ART

Using liquid crystal display (LCD) panels as in-vehicle display panels to display information such as speed per hour and fuel consumption has become a mainstream development trend for in-vehicle display technology. However, the LCD panels need to be equipped with a backlight source to achieve display functions. Therefore, if the backlight source malfunctions, it will cause a full-screen black screen of the in-vehicle display panel, threatening driving safety of drivers.

SUMMARY

The present application provides a backlight module, an in-vehicle display panel, and a vehicle, which can improve a fault tolerance of the backlight module.

The present application provides a backlight module, comprising:
a first backlight module comprising an opening; and a second backlight module installed in the opening; wherein the first backlight module and the second backlight module are of different types.

Optionally, in some embodiments, the first backlight module is one of a direct-lit backlight module or an edge-lit backlight module, and the second backlight module is another one of the direct-lit backlight module or the edge-lit backlight module.

Optionally, in some embodiments, the direct-lit backlight module is a region-partitioned control backlight module.

Optionally, in some embodiments, the first backlight module comprises a first backplate, and the second backlight module comprises a second backplate, wherein the opening is defined in the first backplate, and the second backplate is detachably installed in the opening.

Optionally, in some embodiments, the first backplate comprises a first body portion, a second body portion, and an extension plate; the second body portion is disposed between the first body portion and the extension plate; the first body portion and the extension plate are perpendicularly connected to the second body portion; the first body portion, the second body portion, and the extension plate surround the opening; the second backlight module further comprises a second sealant frame; and the second sealant frame is fixed to an outer side of the second backplate and detachably installed in the opening.

Optionally, in some embodiments, the first backlight module comprises a first sealant frame, the first sealant frame comprises a first connection portion and a first support portion, the first connection portion is fixed to an outer side of the first body portion, and the first support portion extends from one end of the first connection portion away from the second body portion toward a center of the first backplate; the second sealant frame comprises a second connection portion and a second support portion, the second connection portion is fixed to the outer side of the second backplate and detachably installed in the opening; and the second support portion extends from one end of the second connection portion away from the second body portion toward a center of the second backplate.

Optionally, in some embodiments, a side surface of the first support portion away from the first backplate and a side surface of the second support portion away from the second backplate are arranged at a same level.

Optionally, in some embodiments, the first backlight module further comprises a plurality of first light sources arranged on the first backplate, and a diffuser plate arranged on the first light sources; the second backlight module further comprises a plurality of second light sources arranged on one side of the second backplate, a light guide plate arranged on the second backplate, and a side portion of the light guide plate faces the second light sources.

Optionally, in some embodiments, the first light sources comprise sub-millimeter light emitting diodes or micro light emitting diodes.

Optionally, in some embodiments, thermal conductivity of the first backplate is greater than thermal conductivity of the second backplate.

Optionally, in some embodiments, the first backplate is a cast aluminum plate, and the second backplate is a sheet metal plate.

Optionally, in some embodiments, a first engagement portion is arranged on one side of the extension plate close to the opening, an outer side of the second backplate is provided with a second engagement portion for engagement with the first engagement portion, and the second backplate is detachably installed in the opening through the first engagement portion and the second engagement portion.

The present application further provides an in-vehicle display panel, comprising the backlight module of claim 1 and a panel main body, the panel main body comprising a first display portion and a second display portion, wherein the first display portion is disposed above the first backlight module, and the second display portion is disposed above the second backlight module.

Optionally, in some embodiments, the first backlight module comprises a first backplate and a first sealant frame; the first backplate comprises a first body portion, a second body portion, and an extension plate, the second body portion is disposed between the first body portion and the extension plate, and the first body portion and the extension plate are perpendicularly connected to the extension plate; the first sealant frame comprises a first connection portion and a first support portion, the first connection portion is fixed to an outer side of the first body portion, and the first support portion extends from one end of the first connection portion away from the second body portion toward a center of the first backplate.

The second backlight module comprises a second backplate and a second sealant frame, the second sealant frame comprises a second connection portion and a second support portion, the second connection portion is fixed to an outer side of the second backplate, the second support portion extends from one end of the second connection portion away from the second body portion toward a center of the second backplate, and the panel main body is mounted on the first support portion and the second support portion.

Optionally, in some embodiments, the in-vehicle display panel further comprises an adhesive foam tape arranged between the panel main body and the first support portion, and arranged between the panel main body and the second support portion.

The present application further provides a vehicle, comprising an in-vehicle display panel, the in-vehicle display panel comprising the backlight module of claim 1 and a panel main body mounted on the backlight module.

Compared with conventional techniques, the present application provides a backlight module, an in-vehicle display panel, and a vehicle. The backlight module comprises: a first backlight module and a second backlight module. The first backlight module comprises an opening, and the second backlight module is installed in the opening. The first backlight module and the second backlight module are of different types, so that the first backlight module and the second backlight module can emit light separately. As a result, when one of the first backlight module or the second backlight module malfunctions, the other one of the first backlight module or the second backlight module can be used, so that the backlight module can still provide a backlight function, thus improving a fault tolerance of the backlight module.

BRIEF DESCRIPTION OF DRAWINGS

The present application is described in detail below in conjunction with the accompanying drawings for ease of understanding the technical solutions and other beneficial effects of the present application.

DETAILED DESCRIPTION OF EMBODIMENTS

Figure 1A:
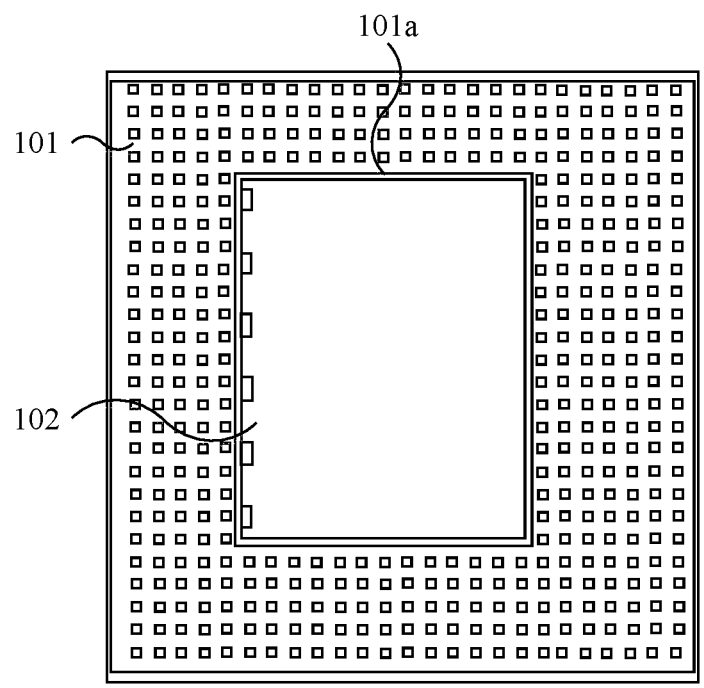
FIGS. 1A to 1E are schematic structural views of a backlight module of the present application.
Figure 1B:
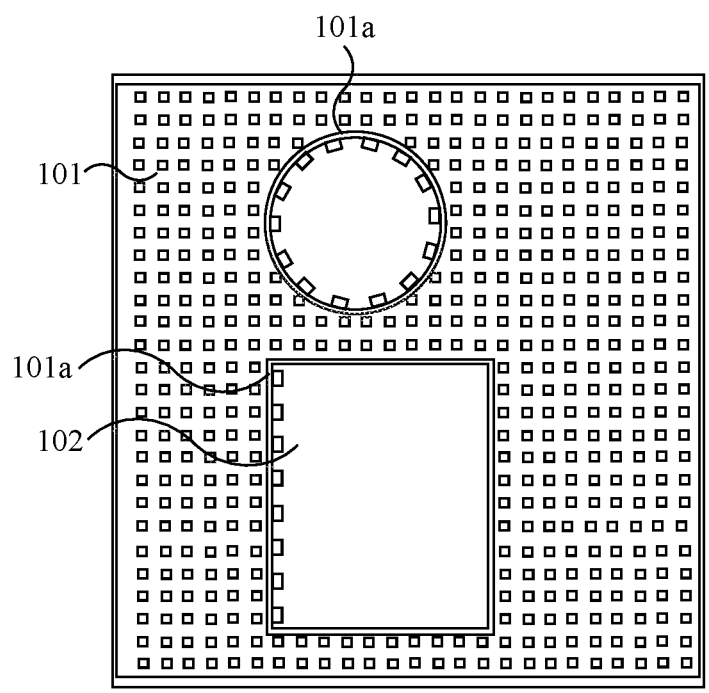

In order to make the purpose, technical solutions, and functions of the present application clearer and more specific, the present application is described in detail below with reference to the accompanying drawings and in conjunction with embodiments. It should be noted that the specific embodiments described here are only used to explain the present application, and are not used to limit the present application.

Specifically, please refer to FIGS. 1A to 1E which are schematic structural views of a backlight module according to the present application. The present application provides a backlight module, and the backlight module comprises a first backlight module 101 and a second backlight module 102.

The first backlight module 101 comprises an opening 101*a*. Optionally, the first backlight module 101 comprises one or multiple openings 101*a*; and in a top view, a shape of each of the openings 101*a* are not limited to a circular shape, a polygonal shape, an elliptical shape, etc.

The second backlight module 102 is installed in one of the openings 101*a*, so that the second backlight module 102 is nested in the first backlight module 101.

The first backlight module 101 and the second backlight module 102 can emit light separately. Therefore, when one of the first backlight module 101 or the second backlight module 102 malfunctions, the backlight module can still provide backlight through the other one of the first backlight module 101 or the second backlight module 102, thereby improving a fault tolerance of the backlight module.

Furthermore, the first backlight module 101 and the second backlight module 102 are of different types, so that the first backlight module 101 and the second backlight module 102 can emit light separately according to different backlight control types to improve the fault tolerance of the backlight module.

Optionally, the first backlight module 101 is one of a direct-lit backlight module or an edge-lit backlight module, and the second backlight module 102 is another one of the direct-lit backlight module or the edge-lit backlight module.

Optionally, the direct-lit backlight module can be a backlight module that adopts a region-partitioned backlight control design, or a backlight module that adopts an integral backlight control design.

Furthermore, a specific structure of the backlight module of the present application is described below by taking as an example that the first backlight module 101 is a direct-lit backlight module, the direct-lit backlight module is a backlight module that adopts the region-partitioned backlight control design, and the second backlight module 102 is an edge-lit backlight module.

Specifically, the first backlight module 101 comprises a first backplate 1011, a plurality of first light sources 1012, and a diffuser plate 1013. The second backlight module 102 comprises a second backplate 1021, a plurality of second light sources 1022, and a light guide plate 1023.

The openings 101*a* are defined in the first backplate 1011, and the second backplate 1021 is detachably installed in one of the openings 101*a*, so that the first backlight module 101 and the second backlight module 102 can be detachably installed.

Specifically, the first backplate 1011 comprises a main body 1011*a* and an extension plate 1011*b*, and the extension plate 1011*b* extends from a middle of the main body 1011*a* to a direction away from the main body 1011*a*, so that the main body 1011*a* and the extension plate 1011*b* both surround the opening 101*a*. Optionally, from a top view, a location of the opening 101*a* is not limited to a middle of the first backplate 1011.

The main body 1011*a* comprises a first body portion 1011*c* and a second body portion 1011*d*. The second body portion 1011*d* is arranged between the first body portion 1011*c* and the extension plate 1011*b*, the first body portion 1011*c* is perpendicularly connected to the second body portion 1011*d*, and the extension plate 1011*b* is perpendicularly connected to the second body portion 1011*d*, so that the first body portion 1011*c* and the extension plate 1011*b* are connected through the second body portion 1011*d*. The first light sources 1012 are disposed on the second body portion 1011*d* of the first backplate 1011, and the diffuser plate 1013 is disposed at one side of the first light sources 1012 away from the second body portion 1011*d*, and the diffuser plate 1013 surrounds the extension plate 1011*b*, so that the first light sources 1012 can cooperate with a local dimming function to make adjustable luminous intensity of each of the first light sources 1012 in the first backlight module 101, thus realizing region-partitioned backlight control of the first light sources 1012 in the first backlight module 101 and making the first backlight module 101 a backlight module with the region-partitioned backlight control design. Optionally, the diffuser plate 1013 can be fixed to the first light sources 1012 by means of a support block 1025, so that a certain interval is defined between the first light sources 1012 and the diffuser plate 1013, and as a result, light emitted by the first light sources 1012 can be irradiated to regions of the diffuser plate 1013. The support block 1025 can be installed on the main body 1011a by using a double-sided adhesive tape.

The second light sources 1022 are arranged on one side of the second backplate 1021, the light guide plate 1023 is located on the second backplate 1021, and a side portion of the light guide plate 1023 faces the second light sources 1022 to simultaneously control luminous intensity of each of the second light sources 1022 in the second backlight module 102. In addition to that, light emitted by the second light sources 1022 is output after it is homogenized by the light guide plate 1023, thus realizing integral backlight control of the second light sources 1022 in the second backlight module 102 and making the second backlight module 102 a backlight module with the integral backlight control design.

Optionally, the first light sources 1012 and/or the second light sources 1022 comprise sub-millimeter light-emitting diodes or micro light-emitting diodes. A number of the first light sources 1012 included in the first backlight module 101 is greater than a number of the second light sources 1022 included in the second backlight module 102. The first light sources 1012 are mounted on the main body 1011a through a thermally conductive adhesive, and the second light sources 1022 are mounted on one side of the second backplate 1021 through a thermally conductive adhesive. Further, thermal conductivity of the first backplate 1011 is greater than thermal conductivity of the second backplate 1021, so that the first backplate 1011 has better heat dissipation performance. Furthermore, a structural strength of the first backplate 1011 is greater than a structural strength of the second backplate 1021. Optionally, due to the consideration of costs and processing difficulty, the first backplate 1011 is a cast aluminum plate, and the second backplate 1021 is a sheet metal plate or a cast aluminum plate. It should be noted that the number of the first light sources 1012 and the number of the second light sources 1022 can be set according to actual requirements, and a detailed description is omitted herein for brevity.

Furthermore, the backlight module further comprises an optical layer 103 disposed at one side of the light guide plate 1023 away from the second backplate 1021 and disposed at one side of the diffuser plate 1013 away from the first light sources 1012.

Figure 2A:
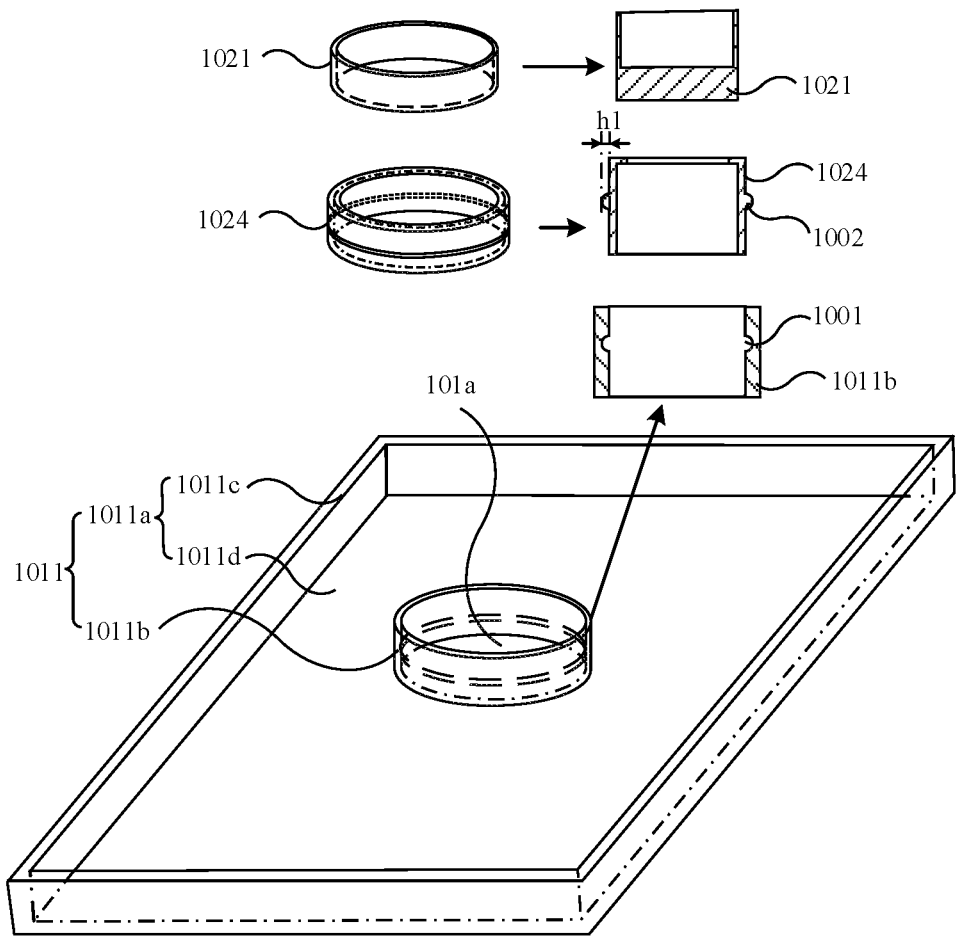
FIGS. 2A to 2B are schematic structural views illustrating installation of a first backlight module and a second backlight module according to the present application.
Figure 2B:
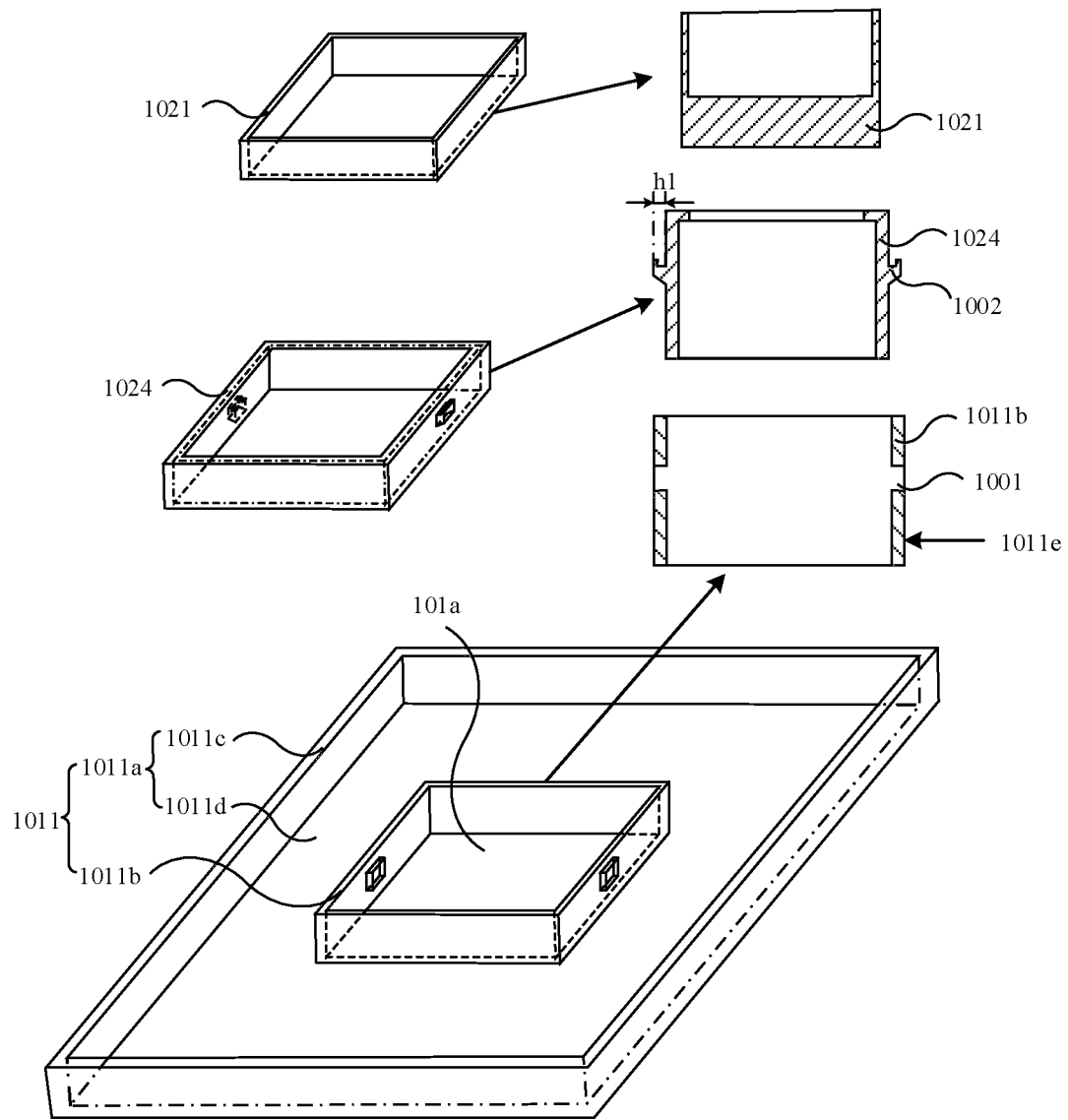

FIGS. 2A to 2B are schematic structural views of the first backplate and the second backplate according to the present application. The extension plate 1011b is provided with a first engagement portion 1001 on one side close to the opening 101a. An outer side of the second backplate 1021 is provided with a second engagement portion 1002, and the first engagement portion 1001 and the second engagement portion 1002 are matched with each other, so the second backplate 1021 is detachably installed in the opening 101a.

Optionally, the first engagement portion 1001 is a groove, and the second engagement portion 1002 is a protrusion, so that the second engagement portion 1002 is engaged in the first engagement portion 1001, as shown in FIG. 2A. Alternatively, the first engagement portion 1001 is a protrusion, the second engagement portion 1002 is a groove, and the first engagement portion 1001 is engaged in the second engagement portion 1002. Alternatively, the first engagement portion 1001 and the second engagement portion 1002 adopt a buckle structure design, as shown in FIG. 2B. The first engagement portion 1001 penetrates through the extension plate 1011b, the second engagement portion 1002 comprises a guiding portion and a positioning portion, and the guiding portion is used to guide the positioning portion to be smoothly mounted on one side 1011e of the extension plate 1011b away from the second backplate 1021. When the second backplate 1021 is installed in the opening 101a, the positioning portion is mounted on one side 1011e of the extension plate 1011b away from the second backplate 1021. It should be noted that when the opening 101a is circular in a top view, the first engagement portion 1001 and the second engagement portion 1002 can also adopt a threaded connection design. Specifically, an external thread is formed on an outer side of the second backplate 1021, and one side of the extension plate 1011b close to the opening 101a is provided with an internal thread that matches the external thread. That is to say, the first engagement portion 1001 includes the internal thread, and the second engagement portion 1002 includes the external thread.

It can be understood that the buckle structure design of the first engagement portion 1001 and the second engagement portion 1002 is not limited to a form shown in FIG. 2B. Optionally, the second engagement portion 1002 comprises a first protrusion height h1, and the first protrusion height h1 is equal to 1.5 mm to thereby prevent irreversible deformation of the second backplate 1021 from damaging the second backplate 1021 when the second backplate 1021 is detachably installed in the opening 101a.

Optionally, the first backplate 1011 is provided with multiple first engagement portions 1001, and the outer side of the second backplate 1021 is correspondingly provided with multiple second engagement portions 1002, so that the present application can ensure that when the second backplate 1021 is installed in the opening 101a, the second backplate 1021 is not detached from the first backplate 1011, which improves reliability of installation.

Furthermore, in order to avoid damage to the second backplate 1021 when the second backplate 1021 is detachably installed in the opening 101a, the second backlight module 102 further comprises a second sealant frame 1024, the second sealant frame 1024 is fixed to the outer side of the second backplate 1021 and can be detachably installed in the opening 101a to realize detachable installation of the second backplate 1021. During installation, the second sealant frame 1024 is slightly deformed until the second engagement portion 1002 is aligned with the first engagement portion 1001. The slight deformation of the second sealant frame 1024 disappears, and the second sealant frame 1024 is installed in the opening 101a.

Furthermore, the second engagement portion 1002 is disposed on one side of the second sealant frame 1024 away from the second backplate 1021, and the second light sources 1022 are disposed on one side of the second backplate 1021 away from the second sealant frame 1024.

Optionally, the second sealant frame 1024 is an injection molded part, and a material of the second sealant frame 1024 comprises thermoplastic resin. Furthermore, the material of the second sealant frame 1024 comprises polycarbonate.

Figure 1C:
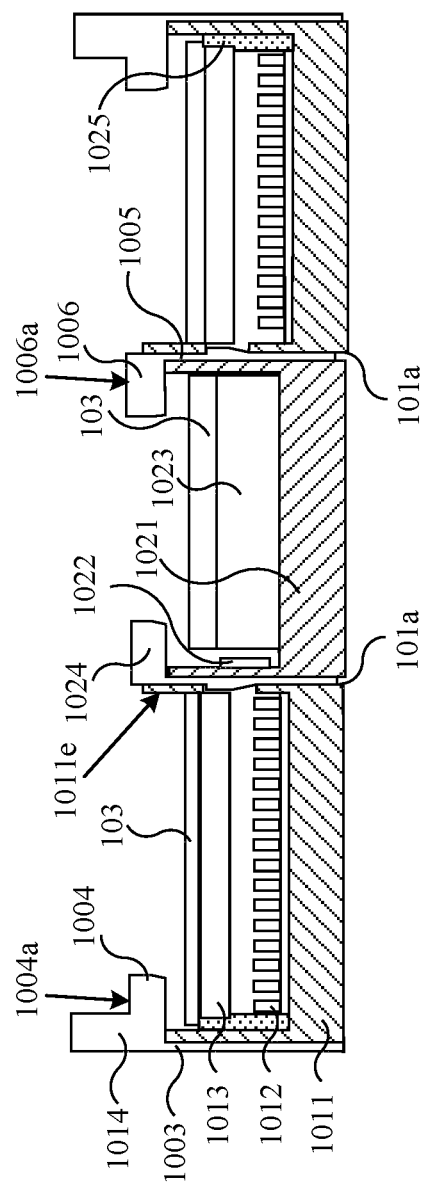
Figure 1D:
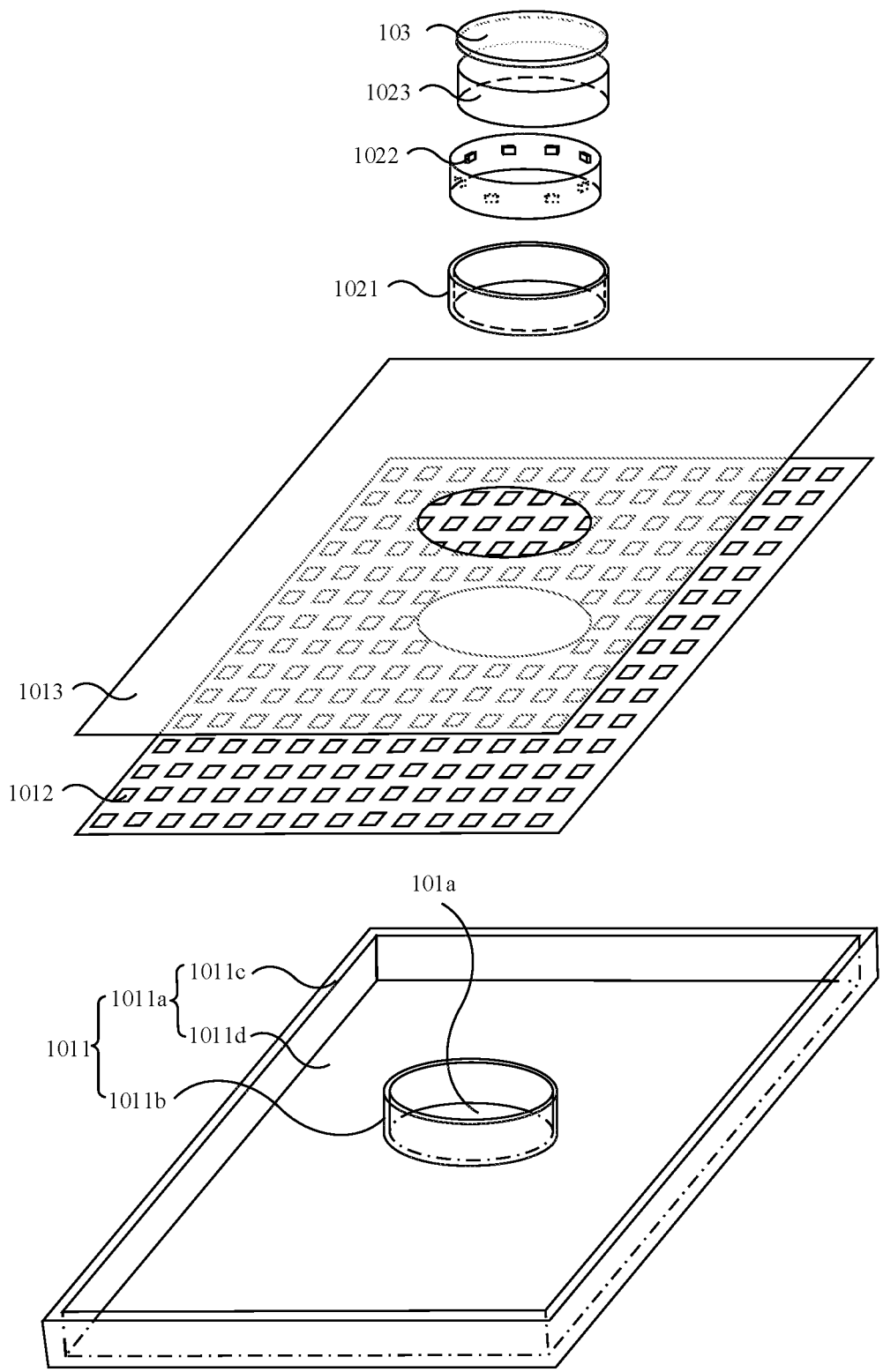
Figure 1E:
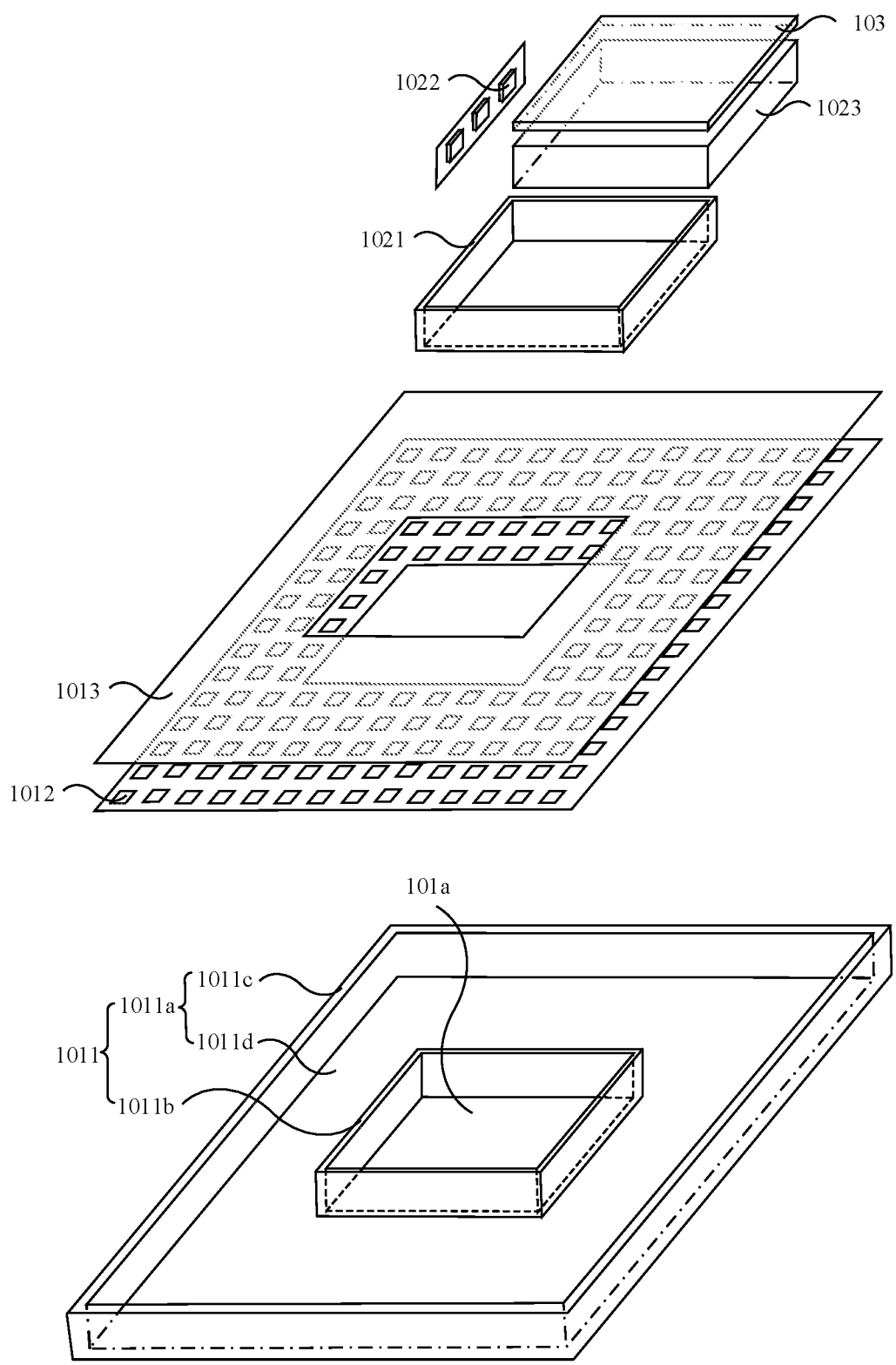

Please continue to refer to FIG. 1C. The first backlight module 101 further comprises a first sealant frame 1014. The first sealant frame 1014 comprises a first connection portion 1003 and a first support portion 1004. The first connection portion 1003 is located at an outer side of the main body 1011a. That is to say, the first connection portion 1003 is located at an outer side of the first body portion 1011c. The first support portion 1004 extends from one end of the first connection portion 1003 away from the main body 1011a toward a center of the first backplate 1011. That is to say, the first support portion 1004 extends from one end of the first connection portion 1003 away from the second body portion 1011d toward a side of the extension plate 1011b. The second sealant frame 1024 comprises a second connection portion 1005 and a second support portion 1006. The second connection portion 1005 is fixed to the outer side of the second backplate 1021 and can be detachably installed in the opening 101a. The second support portion 1006 extends from one end of the second connection portion 1005 away from the second body portion 1011d toward a center of the second backplate 1021, and a side surface 1004a of the first support portion 1004 away from the first backplate 1011 and a side surface 1006a of the second support portion 1006 away from the second backplate 1021 are located at a same level to provide support for subsequent installation of a panel main body.

In addition, the first backlight module 101 can also be an edge-lit backlight module, and the second backlight module 102 is a direct-lit backlight module with the integral backlight control design or region-partitioned backlight control design, and a detailed description is omitted herein for brevity. It can be understood that the first backlight module 101 and the second backlight module 102 emitting light separately is not only realized by using the first backlight module 101 and the second backlight module 102 of different types. In the case where the types of the first backlight module 101 and the second backlight module 102 are same, the realization can be achieved by setting different control circuits or different control types, and a detailed description is omitted herein for brevity. Scenarios in which types of the first backlight module 101 and the second backlight module 102 are the same comprise the following. The first backlight module 101 can be a direct-lit backlight module with the region-partitioned backlight control design, and the second backlight module 102 is a direct-lit backlight module with the integral backlight control design or the region-partitioned backlight control design; or, the first backlight module 101 is a direct-lit backlight module with the integral backlight control design, and the second backlight module 102 is a direct-lit backlight module with the integral backlight control design or the region-partitioned backlight control design; or, the first backlight module 101 and the second backlight module 102 are both edge-lit backlight modules.

One embodiment of the present application also provides an in-vehicle display panel which comprises any of the above-mentioned backlight modules.

Figure 3A:
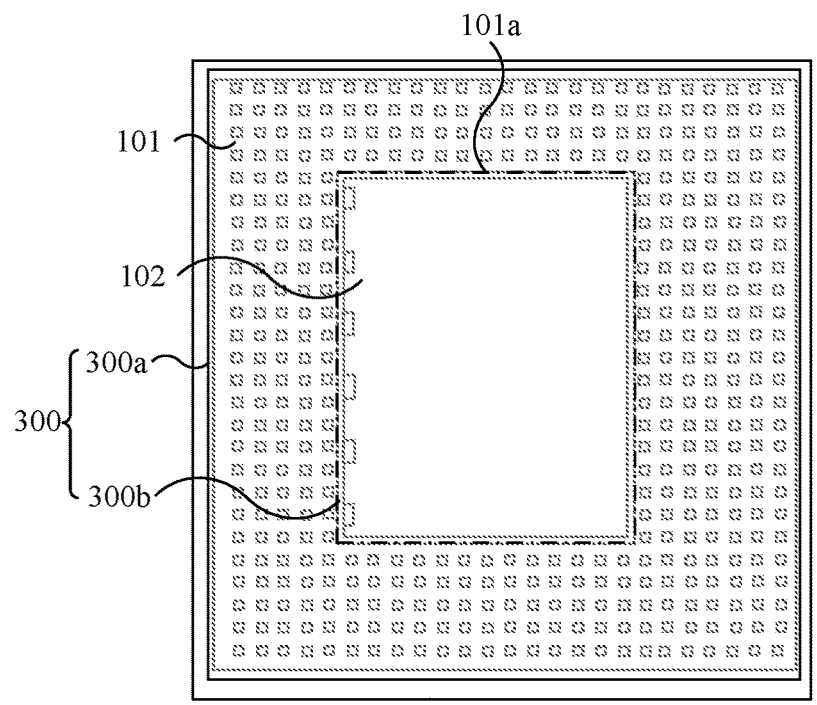
FIGS. 3A to 3B are schematic structural views illustrating an in-vehicle display panel according to the present application.
Figure 3B:
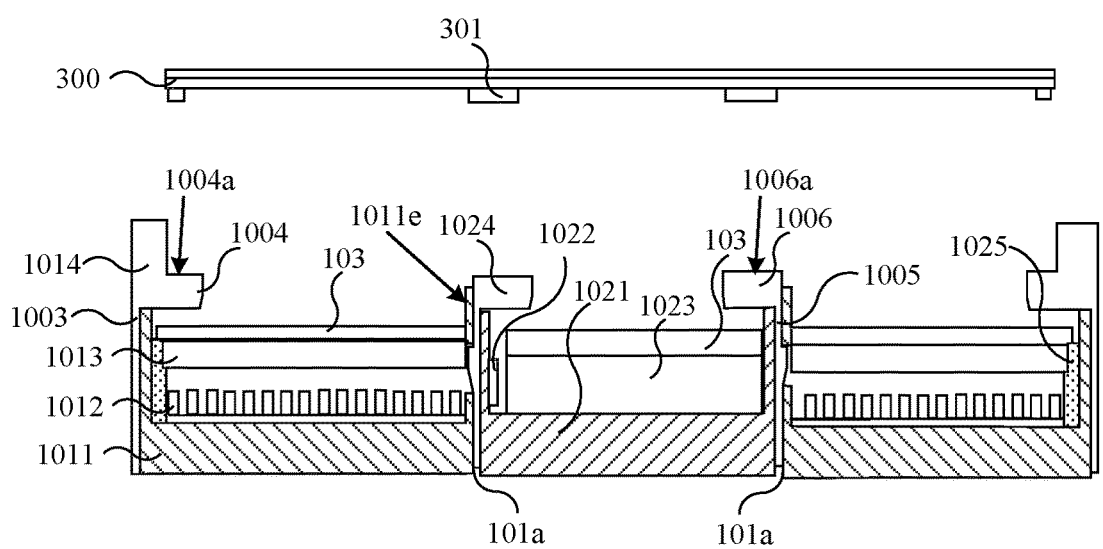

FIGS. 3A to 3B are schematic structural views illustrating the in-vehicle display panel of the present application. The present invention also provides an in-vehicle display panel which comprises the above-mentioned backlight module and a panel main body 300.

The panel main body 300 comprises a first display portion 300a and a second display portion 300b, the first display portion 300a is arranged above the first backlight module 101 of the backlight module, and the second display portion 300b is arranged above the second backlight module 102 of the backlight module.

Since the first backlight module 101 and the second backlight module 102 can separately provide backlight for the first display portion 300a and the second display portion 300b, when one of the first backlight module 101 or the second backlight module 102 malfunctions, the other one of the first backlight module 101 or the second backlight module 102 can cooperate with the panel main body 300 to ensure the in-vehicle display panel still has a certain level of display functions.

Specifically, the panel main body 300 is installed on the side surface 1004a of the first support portion 1004 away from the first backplate 1011 and the side surface 1006a of the second support portion 1006 away from the second backplate 1021, so the panel main body 300 is supported by the first support portion 1004 and the second support portion 1006.

Furthermore, the in-vehicle display panel further comprises an adhesive foam tape 301 which is arranged between the panel main body 300 and the first support portion 1004, and between the panel main body 300 and the second support portion 1006.

Moreover, when the first backlight module 101 is a backlight module with the region-partitioned backlight control design (the backlight is controlled by regions), and the second backlight module 102 is a backlight module with the integral backlight control design (the backlight is controlled as a whole). The first display portion 300a has a higher contrast ratio than a contrast ratio of the second display portion 300b. When external ambient light is strong, a displayed content of the first display portion 300a has better display clarity than display clarity of a displayed content of the second display portion 300b. Optionally, the first display portion 300a is used to display information such as vehicle speed and mileage, and the second display portion 300b can be used to display information such as tire pressure and fuel consumption. The displayed content of the first display portion 300a can be adjusted according to actual needs, and a detailed description is omitted herein.

Furthermore, when backlights are provided for the panel main body 300 with a same display area, the number of the first light sources 1012 included in the first backlight module 101 is greater than the number of the second light sources 1022 included in the second backlight module 102, thus increasing manufacturing costs of the backlight module. However, the greater the number of the first light sources 1012 included in the first backlight module 101, the finer the display quality of the first display portion 300a. Therefore, considering both the manufacturing costs and display performance, the present application has a display size of the second display portion 300b to be less than or equal to 0.5 times a display size of the in-vehicle display panel.

For example, when the display size of the in-vehicle display panel is 12.3 inches, the display size of the second display portion 300b is 4.2 inches or 3.5 inches; when the display size of the in-vehicle display panel is 26.3 inches, the display size of the second display portion 300b is 7 inches or 8 inches. Optionally, in a top view, the location of the opening 101a is not limited to the middle of the first backplate 1011. It should be noted that a number of the openings 101a is not limited to one. Specifically, the openings 101a can also comprise a first opening, a second opening, etc. The second backlight module 102 comprises a first sub-backlight module installed in the first opening and a second sub-backlight module installed in the second opening. The second display portion 300b comprises a first sub-display portion located above the first sub-backlight module, a second sub-display portion located above the second sub-backlight module, etc. At least one of the first sub-backlight module or the second sub-backlight module is of a backlight control type different from a backlight control type of the first backlight module 101. Further, at least one of the first sub-backlight module or the second sub-backlight module is of a different type from the type of the first backlight module 101, and a detailed description is omitted herein.

Figure 4:
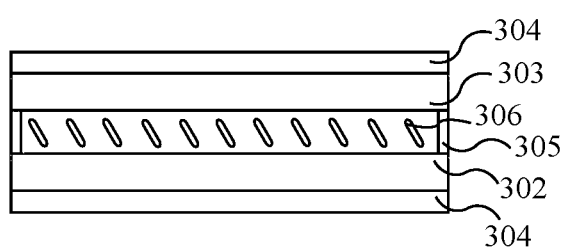
FIG. 4 is a schematic structural view illustrating a panel main body according to the present application.

FIG. 4 is a schematic structural view illustrating a panel main body of the present application. The panel main body 300 comprises an array substrate 302, a color filter substrate 303, a polarizer 304, and a sealant frame 305 located between the array substrate 302 and the color filter substrate 303, and liquid crystals 306. Optionally, the liquid crystals 306 comprise positive liquid crystals and negative liquid crystals. Further, the panel main body 300 further comprises common electrodes, pixel electrodes, touch electrodes, alignment layers, color filter layers, and other parts not shown.

One embodiment of the present application also provides a vehicle comprising any of the above-mentioned in-vehicle display panels. Display functions are realized by using the first backlight module and the second backlight module in cooperation with the panel main body. When one of the first backlight module or the second backlight module malfunctions, the other one of the first backlight module or the second backlight module can be used to cooperate with the panel main body to ensure that the in-vehicle display panel still has a certain level of display functions, which improves the fault tolerance of the backlight module, improves the reliability and stability of the in-vehicle display panel, and ensures driving safety.

Optionally, the in-vehicle display panel can serve as a central control display, a dashboard display, a rearview mirror display, a head-up display, etc.

Specific examples are used in the present disclosure to illustrate the working principles and embodiments of the application. The descriptions of the above embodiments are only used for ease of understanding methods and main ideas of the present application. According to the ideas of the present application, those skilled in the art can modify the specific embodiments and the protection scope of the present application. In summary, the content of the present specification should not be construed as a limitation to the present application.

What is claimed is:

1. A backlight module, comprising:
a first backlight module comprising an opening; and
a second backlight module installed in the opening;
wherein the first backlight module and the second backlight module are of different types, the first backlight module is one of a direct-lit backlight module or an edge-lit backlight module, and the second backlight module is another one of the direct-lit backlight module or the edge-lit backlight module;
wherein the first backlight module comprises a first backplate, and the second backlight module comprises a second backplate, wherein the opening is defined in the first backplate, and the second backplate is detachably installed in the opening;
wherein the first backplate comprises a first body portion, a second body portion, and an extension plate; the second body portion is disposed between the first body portion and the extension plate; the first body portion and the extension plate are perpendicularly connected to the second body portion; the first body portion, the second body portion, and the extension plate surround the opening;
wherein the first backlight module comprises a first sealant frame, the first sealant frame comprises a first connection portion and a first support portion, the first connection portion is fixed to an outer side of the first body portion, and the first support portion extends from one end of the first connection portion away from the second body portion toward a center of the first backplate; the second backlight module further comprises a second sealant frame; and the second sealant frame is fixed to an outer side of the second backplate and detachably installed in the opening, the second sealant frame comprises a second connection portion and a second support portion, the second connection portion is fixed to the outer side of the second backplate and detachably installed in the opening; and the second support portion extends from one end of the second connection portion away from the second body portion toward a center of the second backplate.

2. The backlight module according to claim 1, wherein the direct-lit backlight module is a region-partitioned control backlight module.

3. The backlight module according to claim 1, wherein a side surface of the first support portion away from the first backplate and a side surface of the second support portion away from the second backplate are arranged at a same level.

4. The backlight module according to claim 1, wherein a first engagement portion is arranged on one side of the extension plate close to the opening, an outer side of the second backplate is provided with a second engagement portion for engagement with the first engagement portion, and the second backplate is detachably installed in the opening through the first engagement portion and the second engagement portion.

5. The backlight module according to claim 1, wherein the first backlight module further comprises a plurality of first light sources arranged on the first backplate and a diffuser plate arranged on the first light sources; the second backlight module further comprises a plurality of second light sources arranged on one side of the second backplate, a light guide plate arranged on the second backplate, and a side portion of the light guide plate faces the second light sources.

6. The backlight module according to claim 5, wherein the first light source comprises a sub-millimeter light emitting diode or a micro light emitting diode.

7. The backlight module according to claim 1, wherein thermal conductivity of the first backplate is greater than thermal conductivity of the second backplate.

8. The backlight module according to claim 7, wherein the first backplate is a cast aluminum plate, and the second backplate is a sheet metal plate.

9. An in-vehicle display panel, comprising the backlight module of claim 1 and a panel main body, the panel main body comprising a first display portion and a second display portion, wherein the first display portion is disposed above the first backlight module, and the second display portion is disposed above the second backlight module.

10. The in-vehicle display panel according to claim 9, wherein the first backlight module comprises a first backplate and a first sealant frame; the first backplate comprises a first body portion, a second body portion, and an extension plate; the second body portion is disposed between the first body portion and the extension plate, and the first body portion and the extension plate are perpendicularly connected to the second body portion; the first sealant frame comprises a first connection portion and a first support portion, the first connection portion is fixed to an outer side of the first body portion, and the first support portion extends from one end of the first connection portion away from the second body portion toward a center of the first backplate; and the second backlight module comprises a second backplate and a second sealant frame, the second sealant frame comprises a second connection portion and a second support portion, the second connection portion is fixed to an outer side of the second backplate, the second support portion extends from one end of the second connection portion away from the second body portion toward a center of the second backplate, and the panel main body is mounted on the first support portion and the second support portion.

11. The in-vehicle display panel according to claim 10, further comprising an adhesive foam tape arranged between the panel main body and the first support portion and arranged between the panel main body and the second support portion.

12. A vehicle, comprising an in-vehicle display panel, the in-vehicle display panel comprising the backlight module of claim 1 and a panel main body mounted on the backlight module.

13. The vehicle according to claim 12, wherein the first backlight module is one of a direct-lit backlight module or an edge-lit backlight module, and the second backlight module is another one of the direct-lit backlight module or the edge-lit backlight module.

14. The vehicle according to claim 12, wherein the first backlight module comprises a first backplate, and the second backlight module comprises a second backplate, wherein the opening is defined in the first backplate, and the second backplate is detachably installed in the opening.

15. The vehicle according to claim 14, wherein the first backplate comprises a first body portion, a second body portion, and an extension plate, the second body portion is disposed between the first body portion and the extension plate, the first body portion and the extension plate are perpendicularly connected to the second body portion, the first backlight module further comprises a first sealant frame, the first sealant frame comprises a first connection portion and a first support portion, the first connection portion is fixed to an outer side of the first body portion, and the first support portion extends from one end of the first connection portion away from the second body portion toward a center of the first backplate; and the second backlight module further comprises a second sealant frame, the second sealant frame comprises a second connection portion and a second support portion, the second connection portion is fixed to an outer side of the second backplate, the second support portion extends from one end of the second connection portion away from the second body portion toward a center of the second backplate, and the panel main body is mounted on the first support portion and the second support portion.

16. The vehicle according to claim 14, wherein thermal conductivity of the first backplate is greater than thermal conductivity of the second backplate.

17. A backlight module, comprising:

a first backlight module comprising an opening; and a second backlight module installed in the opening;

wherein the first backlight module and the second backlight module are of different types, the first backlight module is one of a direct-lit backlight module or an edge-lit backlight module, and the second backlight module is another one of the direct-lit backlight module or the edge-lit backlight module;

wherein the first backlight module comprises a first backplate, and the second backlight module comprises a second backplate, wherein the opening is defined in the first backplate, and the second backplate is detachably installed in the opening;

wherein the first backplate comprises a first body portion, a second body portion, and an extension plate; the second body portion is disposed between the first body portion and the extension plate; the first body portion and the extension plate are perpendicularly connected to the second body portion; the first body portion, the second body portion, and the extension plate surround the opening;

wherein a first engagement portion is arranged on one side of the extension plate close to the opening, an outer side of the second backplate is provided with a second engagement portion for engagement with the first engagement portion, and the second backplate is detachably installed in the opening through the first engagement portion and the second engagement portion.

18. The backlight module according to claim 17, wherein the direct-lit backlight module is a region-partitioned control backlight module.

19. The backlight module according to claim 17, wherein the first backlight module further comprises a plurality of first light sources arranged on the first backplate and a diffuser plate arranged on the first light sources; the second backlight module further comprises a plurality of second light sources arranged on one side of the second backplate, a light guide plate arranged on the second backplate, and a side portion of the light guide plate faces the second light sources.

20. The backlight module according to claim 17, wherein thermal conductivity of the first backplate is greater than thermal conductivity of the second backplate.

* * * * *